United States Patent
Christensen et al.

(10) Patent No.: US 12,330,973 B2
(45) Date of Patent: Jun. 17, 2025

(54) ON-DEMAND WATER TREATMENT SYSTEM

(71) Applicant: Robert Bosch GmbH, Stuttgart (DE)

(72) Inventors: Jake Christensen, Elk Grove, CA (US); Sondra Hellstrom, East Palo Alto, CA (US); Soo Kim, Fremont, CA (US); Michael Metzger, Sunnyvale, CA (US); Saravanan Kuppan, San Jose, CA (US)

(73) Assignee: Robert Bosch GmbH, Stuttgart (DE)

( * ) Notice: Subject to any disclaimer, the term of this patent is extended or adjusted under 35 U.S.C. 154(b) by 623 days.

(21) Appl. No.: 17/412,948

(22) Filed: Aug. 26, 2021

(65) Prior Publication Data
US 2023/0064773 A1 Mar. 2, 2023

(51) Int. Cl.
| C02F 1/00 | (2023.01) |
| C02F 1/42 | (2023.01) |
| C02F 5/02 | (2023.01) |
| H04W 84/18 | (2009.01) |

(52) U.S. Cl.
CPC .............. *C02F 5/02* (2013.01); *C02F 1/008* (2013.01); *C02F 1/42* (2013.01); *H04W 84/18* (2013.01); *C02F 2209/44* (2013.01); *C02F 2307/14* (2013.01)

(58) Field of Classification Search
CPC .......... C02F 5/02; C02F 2307/14; C02F 1/42; C02F 1/008; C02F 5/00; C02F 2209/003; C02F 2209/008; C02F 2209/03; C02F 2209/055; C02F 2209/40; C02F 2301/043; C02F 2209/005; C02F 2209/006; C02F 2209/05; C02F 2301/04; C02F 2209/44;
(Continued)

(56) References Cited

U.S. PATENT DOCUMENTS

| 5,628,895 A | * | 5/1997 | Zucholl | C02F 1/42 |
| | | | | 210/85 |
| 7,083,733 B2 | | 8/2006 | Freydina et al. | |
| 10,822,251 B1 | * | 11/2020 | Chandler, Jr. | C02F 1/42 |

(Continued)

FOREIGN PATENT DOCUMENTS

| CN | 104843919 A | * | 8/2015 | ................ C02F 9/18 |
| CN | 205815274 U |  | 12/2016 | |

(Continued)

OTHER PUBLICATIONS

English Translation of Patent Publication CN 111362329, published Jul. 3, 2020 (Year: 2020).*

(Continued)

*Primary Examiner* — Joseph W Drodge
(74) *Attorney, Agent, or Firm* — Brooks Kushman P.C.

(57) ABSTRACT

A water treatment system centrally communicates and controls one or more water treatment devices to regulate the use of the one or more water treatment devices. The water treatment system is configured to enable a localized, on-demand supply of purified water throughout a building or a network of buildings. The water treatment system may control a degree of purity (e.g., water hardness or concentration of dissolved salts) via mixing of purified and unpurified water streams in a controllable ratio (e.g., via one or more controllable valves or one or more tunable water softening units).

12 Claims, 2 Drawing Sheets

(58) Field of Classification Search
CPC ....... H04W 84/18; B01D 17/12; B01D 24/38; B01D 24/383; B01D 24/48
See application file for complete search history.

(56) References Cited

U.S. PATENT DOCUMENTS

| | | | |
|---|---|---|---|
| 10,988,391 B2 | 4/2021 | Kim et al. | |
| 11,655,904 B1* | 5/2023 | Chandler, Jr. | ........... C02F 1/006 137/78.1 |
| 2005/0109703 A1* | 5/2005 | Newenhizen | ........ B01D 61/081 210/257.2 |
| 2011/0132818 A1* | 6/2011 | Dopslaff | ................... B01J 47/14 210/96.1 |
| 2013/0082002 A1* | 4/2013 | Robakowski | ............. C02F 1/42 210/662 |
| 2013/0105322 A1* | 5/2013 | Averbeck | ................ C02F 1/469 204/554 |
| 2013/0240446 A1* | 9/2013 | Pavan | ..................... C02F 1/442 210/87 |
| 2018/0354811 A1* | 12/2018 | Vielma | ................... C02F 1/008 |
| 2019/0079064 A1 | 3/2019 | Jenkins | |
| 2019/0375658 A1* | 12/2019 | Ness | ................... B01F 25/4315 |
| 2020/0123027 A1 | 4/2020 | Kornbluth et al. | |
| 2020/0123028 A1 | 4/2020 | Kim et al. | |
| 2020/0123029 A1 | 4/2020 | Kornbluth et al. | |
| 2020/0131058 A1 | 4/2020 | Kim et al. | |
| 2020/0148560 A1 | 5/2020 | Hellstrom et al. | |
| 2020/0399149 A1 | 12/2020 | Kim et al. | |
| 2021/0039970 A1 | 2/2021 | Metzger et al. | |
| 2021/0198124 A1 | 7/2021 | Metzger et al. | |
| 2022/0316191 A1* | 10/2022 | Clarke | ................... C02F 1/003 |

FOREIGN PATENT DOCUMENTS

| | | | |
|---|---|---|---|
| CN | 209604239 U | | 11/2019 |
| CN | 111362329 A | * | 7/2020 |
| DE | 3625337 A1 | * | 2/1987 ................ C02F 1/42 |
| EP | 2385020 A1 | * | 11/2011 .......... B01J 49/0086 |
| WO | WO-2021155110 A1 | * | 8/2021 ................ C02F 1/42 |

OTHER PUBLICATIONS

English Translation of Patent Publication WO 2021155110, published Aug. 5, 2021 (Year: 2021).*
English Translation of Patent Publication DE 3625337A1, Spiegl, published Feb. 19, 1987. (Year: 1987).*
English Translation of Patent Publication CN 10483919A, Li, published Aug. 19, 2015. (Year: 2015).*
English translation of Patent Publication EP 2385020, published Nov. 9, 2011. (Year: 2011).*
Kim et al., "Low Energy Desalination Using Battery Electrode Deionization," Environmental Science & Technology Letters, 2017, vol. 4, pp. 444-449, DOI: 10.1021/acs.estlett.7b00392.
Kim et al., "Na2FeP2O7 as a Novel Material for Hybrid Capacitive Deionization," Electrochimica Acta, 2016, vol. 203, pp. 265-271, http://dx.doi.org/10.1016/j.electacta.2016.04.056.
Lee et al., "Hybrid capacitive deionization to enhance the desalination performance of capacitive techniques," Energy & Environmental Science, 2014, vol. 7, pp. 3683-3689, DOI: 10.1039/c4ee02378a.
Lee et al., "Rocking Chair Desalination Battery Based on Prussian Blue Electrodes," ACS Omega, 2017, vol. 2, pp. 1653-1659, DOI: 10.1021/acsomega.6b00526.
Metzger et al., "Techno-economic analysis of capacitive and intercalative water deionization," Energy & Environmental Science, 2020, vol. 13, pp. 1544-1560, DOI: 10.1039/d0ee00725k.
Sebti et al., "Removal of Na+ and Ca2+ with Prussian blue analogue electrodes for brackish water desalination," Desalination, 2020, 114479, vol. 487, pp. 1-12, https://doi.org/10.1016/j.desal.2020.114479.
Smith et al., "Na-Ion Desalination (NID) Enabled by Na-Blocking Membranes and Symmetric Na-Intercalation: Porous-Electrode Modeling," Journal of The Electrochemical Society, 2016, vol. 163, No. 3, pp. A530-A539, DOI: 10.1149/2.0761603jes.

* cited by examiner

ON-DEMAND WATER TREATMENT SYSTEM

TECHNICAL FIELD

The present disclosure relates to an on-demand water treatment system.

BACKGROUND

Water is typically classified according to hardness as "soft water" or "hard water." The harder the water, the greater the concentration of calcium and/or magnesium ions per volume. Hard water is typically undesirable because it can cause scale buildup in plumbing, fixtures, and appliances and may affect the performance these systems and devices. For instance, the heat from a hot water heater removes some calcium carbonate and magnesium carbonate from the water, resulting in scale buildup that can slow the heating process and increase energy usage. Cleaning agents used with hard water are often less effective. Clothes washed in hard water may become dingy and gray with time and feel harsh or scratchy. Glassware may become spotted as it dries. Films may be left on shower doors or curtains, walls, and tubs, and hair washed in hard water may look dull and not feel clean. The process of removing calcium ions and/or magnesium ions from hard water is commonly referred to as water softening.

SUMMARY

According to one embodiment, a water treatment system for treating water in a building is disclosed. The water treatment system includes a water treatment computer including non-transitory computer-readable medium comprising instructions for treating water that, when executed by a processor, cause the processor to perform the water treatment operations. The operations include receiving a first user input from a first interface associated with a first appliance or outlet and indicative of one or more first values of one or more first water properties for the first appliance or outlet. The operations further include receiving a second user input from a second interface associated with a second appliance or outlet and indicative of one or more second values of the one or more second water properties for the second appliance or outlet. The operations additionally include transmitting first instructions to a first water treatment device in response to the one or more first values of the one or more first water properties, the first instructions configured to direct the first water treatment device to deliver water with the one or more first values of the one or more first water properties to the first appliance or outlet. The operations also include transmitting second instructions to a second water treatment device in response to the one or more second values of the one or more second water properties, the second instructions configured to direct the second water treatment device to deliver water with the one or more second values of the second water properties to the second appliance or outlet.

According to a second embodiment, a water treatment system for treating water in a building is disclosed. The water treatment system includes a water treatment device configured to admit an input water stream and to provide first and second outlet streams. The first outlet stream has a first value of a water property, and the second outlet stream has a second value of the water property. The water treatment system includes a valve configured to receive the first and second outlet streams and a third outlet stream. The water treatment system further includes a water treatment computer including non-transitory computer-readable medium comprising instructions for treating water that, when executed by a processor, cause the processor to perform the following operations: receiving an input of a third value of the water property from a user interface of an appliance or outlet; and transmitting first control instructions to a regulating device to adjust a ratio of the first value of the first outlet steam and the second value of the second outlet stream to provide the third value of the third outlet stream with the third value of the water property to the appliance or outlet.

According to a third embodiment, a water treatment system for treating water in a building is disclosed. The water treatment system includes a water treatment computer including non-transitory computer-readable medium comprising instructions for treating water that, when executed by a processor, cause the processor to perform the following operations: receiving a user input from an interface associated with an appliance or outlet and indicative of one or more values of one or more water properties for the appliance or outlet; and transmitting first instructions to a water treatment device in response to the one or more values of the one or more first water properties; determining a residence time before the water with the one or more values of the one or more water properties is delivered through a pipe to a appliance or outlet; and transmitting an alert when then residence time has elapsed. The first instructions are configured to direct the water treatment device to deliver water with the one or more values of the one or more water properties to the appliance or outlet through the pipe.

DETAILED DESCRIPTION

Figure 1:
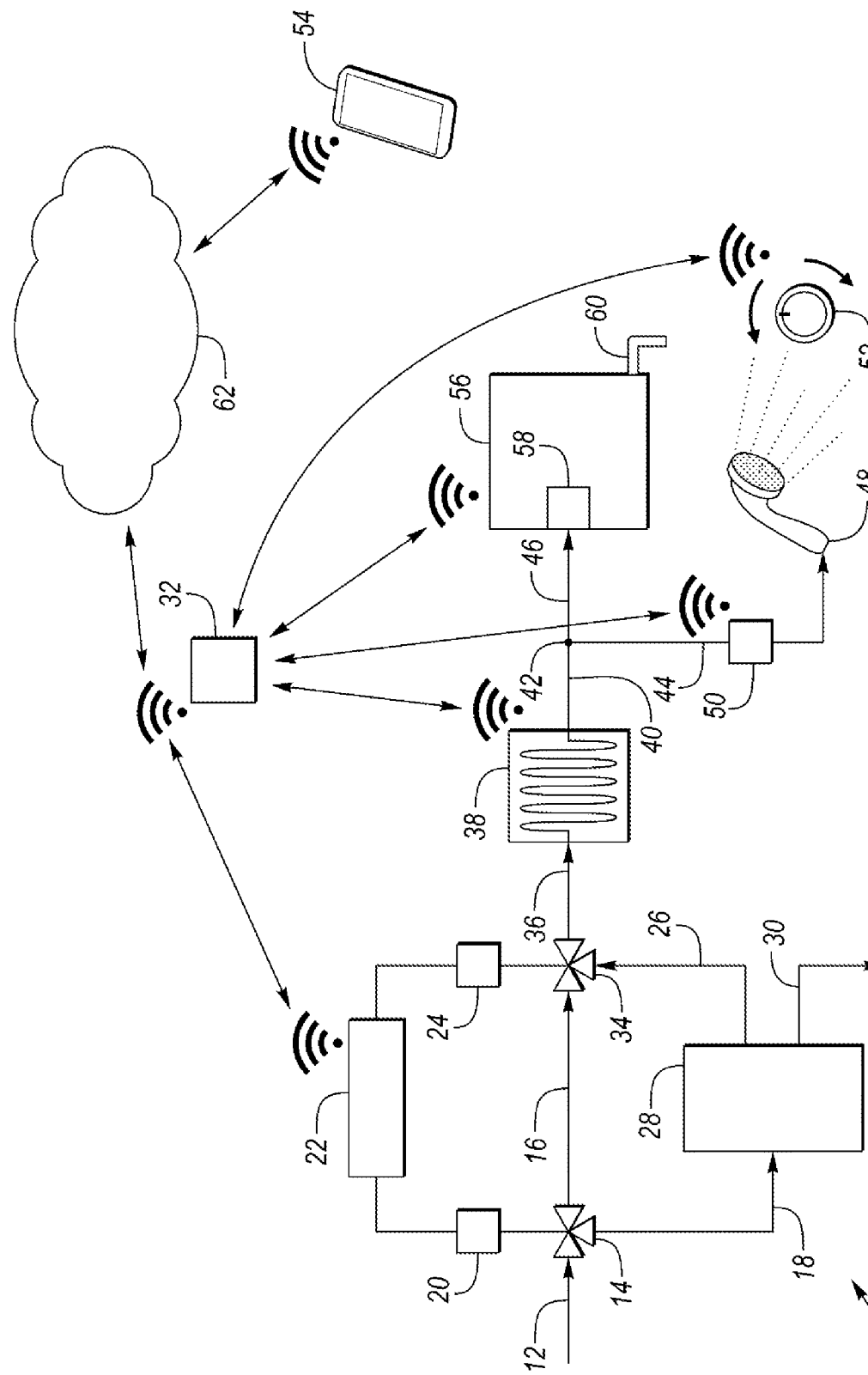
FIG. 1 depicts a schematic diagram of a water treatment system according to a first embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

It must also be noted that, as used in the specification and the appended claims, the singular form "a," "an," and "the" comprise plural referents unless the context clearly indicates otherwise. For example, reference to a component in the singular is intended to comprise a plurality of components.

As used herein, the term "substantially," "generally," or "about" means that the amount or value in question may be the specific value designated or some other value in its neighborhood. These terms may be used to modify any numeric value disclosed or claimed herein. Generally, the term "about" denoting a certain value is intended to denote a range within ±5% of the value. As one example, the phrase "about 100" denotes a range of 100±5, i.e., the range from 95 to 105. Generally, when the term "about" is used, it can be expected that similar results or effects according to the invention can be obtained within a range of ±5% of the indicated value. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

It should also be appreciated that integer ranges explicitly include all intervening integers. For example, the integer range 1 to 10 explicitly includes 1, 2, 3, 4, 5, 6, 7, 8, 9, and 10. Similarly, the range 1 to 100 includes 1, 2, 3, 4, . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

In the examples set forth herein, concentrations, temperature, and reaction conditions (e.g., pressure, pH, flow rates, etc.) can be practiced with plus or minus 50 percent of the values indicated rounded to or truncated to two significant figures of the value provided in the examples. In a refinement, concentrations, temperature, and reaction conditions (e.g., pressure, pH, flow rates, etc.) can be practiced with plus or minus 30 percent of the values indicated rounded to or truncated to two significant figures of the value provided in the examples. In another refinement, concentrations, temperature, and reaction conditions (e.g., pressure, pH, flow rates, etc.) can be practiced with plus or minus 10 percent of the values indicated rounded to or truncated to two significant figures of the value provided in the examples.

As used herein, the term "and/or" means that either all or only one of the elements of said group may be present. For example, "A and/or B" means "only A, or only B, or both A and B". In the case of "only A", the term also covers the possibility that B is absent, i.e. "only A, but not B".

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of" and "consisting essentially of," where one of these three terms is used herein, the presently disclosed and claimed subject matter can include the use of either of the other two terms.

The term "one or more" means "at least one" and the term "at least one" means "one or more." The terms "one or more" and "at least one" include "plurality" as a subset.

The description of a group or class of materials as suitable for a given purpose in connection with one or more embodiments implies that mixtures of any two or more of the members of the group or class are suitable. Description of constituents in chemical terms refers to the constituents at the time of addition to any combination specified in the description and does not necessarily preclude chemical interactions among constituents of the mixture once mixed. First definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Water municipalities provide potable water to buildings such as homes, hotels, offices, hospitals, schools, stores, and factories. The degree of water purity delivered to each building depends on the water source and/or the municipal water treatment method, among other potential variables. In one scenario, a municipality provides hard water to a building. Hard water may refer to water with a relatively high concentration of salt with divalent cations such as calcium and magnesium. While hard water may be safe to drink, it may have one or more undesirable impacts in residential and/or other settings. For instance, hard water may stain on dishes, bathtubs, etc. Many building users have installed water softeners or other water purifiers to alter the composition of the hard water. For instance, one type of water purifier exchanges hard cations with soft monovalent cations such as sodium. As another example, a water purifier is configured to separate hard salts from the hard water via distillation, reverse osmosis, electrical deionization, etc. before it is piped to various water appliances and/or outlets within a user's home or other building.

While water purifiers eliminate or reduce the undesirable impact of hard water, there may also be one or more associated disadvantages. For example, many water softeners use an ion-exchange device that replaces calcium and magnesium cations with sodium cations. For the water softener to function properly, a constant supply of sodium-based salt must be provided at a cost of monthly or weekly refills of a salt compartment. The resulting soft water has a different taste that may be unpleasant and tends to leave skin with a slippery sensation after washing. The softened water generally cannot be used for irrigation. Accordingly, many homes or other buildings have two or more independent piping networks so that the softened water is not available for irrigation. Many municipalities restrict the amount of salt (including both original hard salt and added soft salt) added to a wastewater stream. Due to one or more of these potential drawbacks, some municipalities may restrict or prohibit the use of ion exchange water softeners.

Other treatment systems may not have one or more of the disadvantages described above. For instance, a water treatment system that does not use the addition of salt may fall into this category. However, these other treatment systems tend to be more energy intensive and therefore treatment of the water system of an entire building or network may be cost prohibitive. Alternatively, a treatment system may be installed at every point of use throughout a building, which may be prohibitively expensive for certain applications. In light of the foregoing, there remains a need for a water treatment system for buildings that addresses one or more of the drawbacks identified above.

In one or more embodiments, one or more water properties (e.g., water hardness) is controlled at an appliance or outlet level rather than a water treatment plant. The water treatment systems of one or more embodiments can deliver a different value for the water properties to different appliances, outlets, and/or users in response to different personal preferences. For example, it is typically recommended to provide soft water (e.g., a high degree of calcium and magnesium salt removal) to appliances such as dishwashers to optimize the condition of dishes as well as the lifetime of the dishwasher. On the other hand, individual users may prefer harder water (lower degree of calcium and magnesium salt removal) when showering or bathing due to how this impacts the feeling of the skin. In conventional households with whole-home softeners, the softener may either be used or bypassed, but individual control of softness or water purity at different points of use and by different users is not afforded. The water treatment system of one or more embodiments provides control at two or more points of use throughout the home or other building.

In one or more embodiments, a water treatment system centrally communicates and controls one or more water treatment devices to regulate the use of the one or more water treatment devices. The water treatment system is configured to enable a localized, on-demand supply of purified water throughout a building or a network of buildings. In one or more embodiments, the water treatment system is configured to control a degree of purity (e.g., water hardness or concentration of dissolved salts) via mixing of purified and unpurified water streams in a controllable ratio (e.g., via one or more controllable valves or one or more tunable water softening units). The water treatment system may include a controllable valve on a treatment device (e.g., a water softener) configured to regulate a ratio of purified to unpurified water in response to user input. In another embodiment, the water treatment system may include a control device (e.g., a device that uses a water softener duty cycle) to enable tunable levels of specific ions in the water being utilized by one or more appliances or components.

The water treatment system (e.g., water purification system) of one or more embodiments is configured to control water purity (e.g., water hardness) on-demand and with a controllable composition at different locations and for various applications throughout a building (e.g., homes, hotels, offices, hospitals, schools, stores, and factories, etc.) or a water distribution network (e.g., a municipal or mutual water company, or at a building or agricultural complex). The water treatment system of one or more embodiments includes a central water treatment device (e.g., water softener), a water heater (e.g., a tankless and/or dual-tank water heater), one or more appliances (e.g., dishwasher, clothes washer, refrigerator, steam oven, etc.) that use water, one or more water outlets (e.g., sinks, showers, outdoor irrigation, etc.), one or more controllable valves, one or more water regulators (e.g., flow regulators and pressure regulators), a communication system configured to link the one or more appliances and/or outlets to the one or more controllable valve, and optionally sensors that measure water purity (e.g., hardness). The water quality can either be adjusted with a tunable water softener or by mixing water from purified and unpurified water sources with one or more controllable valves and one or more water regulators. The water treatment system of one or more embodiments may include a central user interface (e.g., a smart home panel, or an app-based interface on a user's mobile device) configured to permit a user to control the one or more water properties. One or more user interfaces may be installed at or near one or more outlets to allow the user to specify a desired water property (e.g., a degree of water purity at the outlet). Communication between appliances and/or outlets and one or more controllable valves can be carried out wirelessly (e.g., via Bluetooth or wireless router) to simplify the installation of the system in a building. The water treatment system may include a specifically compatible wireless hub to link appliances, outlet controllers, and a water treatment device. The hub may further communicate via a building's wireless router to the cloud, which in turn communicates with mobile devices and/or user computers configured to execute software that can be used to specify desired water properties (e.g., water purity) at different locations throughout the building on demand or according to a desired schedule. The water treatment system of one or more embodiments may include a model of a water control system and an associated feedback control algorithm may be used together with one or more sensors installed in the appliances and/or water outlets to regulate the valve that controls water purity. In one embodiment, a feedback control algorithm may be utilized to receive sensor data at a point of use that determines when a desired water property (e.g., water purity) is obtained and locks in a desired mix of treated and untreated water at a point of softening or other treatment. In another embodiment, the water treatment system is configured with a machine learning model that receives the sensor data to learn a layout of the home or other building and associated time constants associated with piping water streams from the point of softening or other treatment to the point of use.

In one or more embodiments, a water treatment system is configured to operate in a building that does not include a central hot water heater (e.g., a tank or a tankless central hot water heater). Rather, the treatment system includes one or more appliances and/or outlets having an integrated water heater.

In one or more embodiments, a water treatment system includes one or more sensors configured to determine one or more water properties (e.g., hardness, pH, salinity, dissolved oxygen, temperature, and electrical conductivity) at various points in the treatment system. The water treatment system may include a remote server having a database configured to record and store the one or more water properties over time. The water treatment system may be configured to analyze the one or more water properties recorded over time to facilitate a repair to one or more appliances and/or outlets at the building in which the water treatment system operates. The remote server may be configured to enable one or more of the appliances and/or outlets to perform a self-diagnosis and transmit one or more repair signals. The water treatment system may be configured to transmit the self-diagnosis information and the one or more repair signals to a user of the water treatment system. The water treatment system, including the remote server, may be configured to transmit an alert to a user or operator when one or more sensor systems should be replaced.

In one or more embodiments, the treatment system includes one or more sensors upstream of a treatment device (e.g., a water softening device) and configured to determine one or more water properties. The water treatment system may use a feedforward algorithm configured to control the extent of softening or purification of the water upstream of the purification device. A voltage or current applied when using an electrochemical de-ionization device, the flow rate through the device, and/or the degree of mixing between purified and unpurified streams using a valve or other mixer may be controlled to control the extent of softening or purification of the water upstream of the purification device. The data from the upstream sensor and, in some embodiments, in one or more downstream sensors, may be transmitted to a municipality to provide a map of local water quality.

In one or more embodiments, the water treatment system is configured to estimate a water purity at a point of use (e.g., at an appliance or an outlet) using a model for water flow within the building in which the water treatment system is operating. For example, if purified water is desired for use in a first appliance (e.g., a dishwasher), the treatment device (e.g., a water softening device) is activated in response to a demand signal from the dishwasher or the user. The activation may be carried out by adjusting a valve so that water flows through a treatment device and/or a treatment device is turned on in the case of an electrochemical purification device.

The water treatment system may be configured to determine or estimate a residence time of water in response to a pipe distance between the water treatment device and the appliance or outlet and the flow rate of water. In one or more embodiments, the water treatment system includes one or more pressure sensors configured to estimate a water flow rate through one or more pipes in the water treatment system. The one or more pressure sensors may be configured to estimate a water flow rate according to a hydraulic or flow model of plumbing (e.g., using the radius of each of the one or more pipes). The use of one or more pressure sensors is helpful when a plurality of appliances or outlets is using water simultaneously. The flow model may be configured to determine a time at which sufficiently purified water is available at the one or more appliances and/or outlets. For example, when the appliance is a dishwasher, the water treatment system is configured to pass water from an inlet of the dishwasher directly to an outlet until sufficiently purified water is available. At the point in time as estimated by the model at which sufficiently purified water is available, the water is used by the appliance for dishwashing. In another embodiment, at least two appliances and/or outlets are simultaneously controlled to bypass a water stream from the at least two appliances and/or outlets so that the appliances and/or components only use sufficiently purified water.

In one or more embodiments, the water treatment system is configured to feed purified water from at least one a storage tank (e.g., heated or otherwise) by a pump system. The water treatment system may be configured to determine a residence time of the purified water from the storage tank to one or more appliances and/or outlets. In one or more embodiments, the water treatment system is configured with a self-cleaning mode where clean water is supplied, circulated, and purged to the appliances, outlets, and/or pipes in the water treatment system. The water treatment system may include a secondary tank or one or more additional exit streams for storing, removing, and/or over-flowing excess water (e.g., purified and unpurified water). The water treatment system may be configured to determine the residence time of unpurified or partially purified water for applications in which unpurified or partially purified water is used.

In one or more embodiments, the water treatment system is configured to measure a wireless signal between two devices (e.g., hub, controller, appliance, outlet, water purification device, water heater, etc.) and use this measurement to determine a distance between the two devices. The water treatment system may be configured to execute a machine-learning algorithm used in conjunction with the wireless communication signals and other available sensors (e.g., pressure sensors, water purity sensors, etc.) to create a hydraulic map of a building and a model for estimating water properties (e.g., water purity) as a function of position and time.

The water treatment system of one or more embodiments may be integrated as a part of a smart-home environment (e.g., a climate control system, a hazard detector, etc.). A smart-home system of one or more embodiments may include a smart shower head with wireless capability (e.g., Wi-Fi or Bluetooth capability) that Is configured to sense a water property (e.g., water hardness) and communicate with a wireless hub configured to control a water mix. The shower head may include an LED light that changes color once the degree or value of one or more water properties (e.g., water softness and/or temperature) is obtained. The shower head may be configured to alert the user once the desired one or more water properties are met. In a bathtub configuration a drain may be closed automatically (or an alert may alert the user to close the drain) once the desired one or more water properties (e.g., water purity and/or temperature) are met. In one or more embodiments, energy harvesting may be used involving the flow of water through an appliance (e.g., shower head) to recharge a battery that powers the wireless capability, sensor, LED, etc.

FIG. 1 depicts a schematic diagram of water treatment system 10 according to a first embodiment. Water treatment system 10 includes inlet 12 configured to admit a water stream (e.g., a stream of water from a municipal water source). Inlet 12 is configured to direct the water stream into valve 14. As shown in FIG. 1, valve 14 is a three-way valve configured to direct at least a portion of the water stream into pipes 16 and/or 18. Diverter 20 is electrically connected to valve 14 and controller 22. Diverter 20 is configured to change the flow of the water stream between pipes 16 and/or 18. Controller 22 is configured to control diverter 20 to change the flow of the water stream between pipes 16 and/or 18. Controller 22 is also electrically connected to mixer 24.

Mixer 24 is configured to mix water streams from pipes 16 and 26. Controller 22 is configured to control mixer 24 to mix water streams from pipes 16 and 26. Controller 22 may be configured to sense and/or determine a water property of the water stream received from inlet 12. The water property may be the concentration of one or more target ions (e.g., dissolved salts, divalent hard cations such as calcium and magnesium, monovalent soft cations such as sodium, etc.).

Water softener 28 admits a water stream from pipe 18. Water softener 28 treats the water stream to reduce the number of hard cations (e.g., calcium and magnesium cations) in the water stream from pipe 18. Water softener 28 provides a purified water stream to pipe 26 and a wastewater stream to pipe 30. The concentration of hard cations in the purified water stream is less than the concentration of hard cations in the wastewater stream. Controller 22 may be configured to sense and/or determine a water property of the purified water stream received from pipe 26.

Controller 22 is configured to wirelessly communicate with wireless hub 32. The wireless connection may be configured through a personal area network (PAN). Non-limiting examples of technologies that can be implemented with the PAN include Bluetooth technology, induction wireless technology using magnetic induction for close-range communications, infrared wireless technology using infrared signals for close-range communications, ultra-wideband using baseband pulses applied directly to an antenna, and Zigbee technology. The wireless connection may also be implemented using a local area network (LAN) technology or a wide area network (WAN) technology. The communication between controller 22 and wireless hub 32 is bidirectional. Wireless hub 32 may be an electronic device configured for connection to the Internet. A non-limiting example of wireless hub 32 is a wireless router. Wireless hub 32 is configured to transmit data to and receive data from the Internet.

Valve 34 is configured to receive a water stream from pipe 16 and a purified water stream from pipe 26. Controller 22 is configured to control mixer 24 to mix the water stream from pipe 16 and the purified water stream from pipe 26. The mixed water stream exits valve 34 into pipe 36. Pipe 36 is connected between valve 34 and tankless water heater 38. Tankless water heater 38 is configured to wirelessly communicate with wireless hub 32. Tankless water heater 38 may determine and/or sense one or more water properties and transmit the one or more water properties to wireless hub 32. Tankless water heater 38 may also be configured to receive one or more operating instructions from wireless hub 32 and change the operation of tankless water heater 38 in response to the operating instructions.

Tankless water heater 38 is configured to provide a heated water stream to pipe 40. Pipe 40 is connected to junction 42. Junction 42 may include a three-way valve or other mechanism to create water stream in pipe 44 and another water stream in pipe 46. Pipe 44 is configured to provide a water stream to outlet 48. As shown in FIG. 1, outlet 48 is a shower. Sensor 50 is positioned to sense one or more water properties of the water stream flowing into outlet 48. In one or more embodiments, sensor 50 may be optional. Sensor 50 may be a water purity sensor, a flow rate sensor and/or a pressure sensor. The water purity sensor may be configured to sense a concentration of one or more target ions (e.g., dissolved salts, divalent hard cations such as calcium and magnesium, monovalent soft cations such as sodium, etc.) The flow rate sensor may be configured to sense a flow rate of the water stream flowing through pipe 44. The pressure sensor may be configured to sense the pressure of the water stream flowing through pipe 44. Sensor 50 is configured for wireless communication with wireless hub 32.

Outlet 48 is associated with user interface 52. User interface 52 is electrically connected to outlet 48. The electrical connection may be a wired connection or a wireless connection. User interface 52 may be formatted for display on mobile device 54. User interface 52 may be wirelessly connected to wireless hub 32. User interface 52 is configured to receive a user input to change one or more water properties of the water stream flowing through pipe 44. For example, the user input may be a water hardness (e.g., the concentration of calcium and/or magnesium ions per unit volume). User interface 52 may include a display configured to display the current water hardness. User interface 52 may include a dial to reduce the water hardness (e.g., soften the water) or to increase the water hardness (e.g., harden the water).

User interface 52 may be configured to transmit the user input to wireless hub 32. Wireless hub 32 is configured to determine water stream instructions in response to the user input. Wireless hub 32 transmits the water stream instructions to controller 22, which in turn, controls diverter 20 and/or mixer 24 to deliver a water stream to pipe 36 in relation to (e.g., matches) the user input (e.g., delivers the user requested level of water hardness). In one or more embodiments, controller 22 may sense and/or determine water purity properties of the water streams in inlet 12 and/or 26 and use the water properties in controlling diverter 20 and/or mixer 24 to deliver a water stream to pipe 36 in relation to the user input. User interface 52 may also be configured to display an alert alerting a user as to how long the water stream is not at the one or more input water properties. Wireless hub 32 may be configured to determine the amount of time for water treatment system 10 to deliver the water stream with the one or more water properties.

Appliance 56 is configured to receive a water stream from pipe 46. As shown in FIG. 1, appliance 56 is a dishwasher. Appliance 56 may include sensor 58 configured to sense one or more water properties of the water stream flowing into appliance 56. Sensor 58 may be a water purity sensor, a flow rate sensor and/or a pressure sensor. Sensor 58 is configured for wireless communication with wireless hub 32.

Appliance 56 may be associated with a user interface. The appliance user interface may be electrically connected to appliance 56. The electrical connection may be a wired connection or a wireless connection. The appliance user interface may be formatted for display on mobile device 54. The appliance user interface may be wirelessly connected to wireless hub 32. The appliance user interface is configured to receive a user input to change one or more operating properties of the water stream flowing through pipe 46. For example, the user input may be a water hardness (e.g., the concentration of calcium and/or magnesium ions per unit volume). The appliance user interface may include a display configured to display the current water hardness. The appliance user interface may include a dial to reduce the water hardness (e.g., soften the water) or to increase the water hardness (e.g., harden the water).

The appliance user interface may be configured to transmit the user input to wireless hub 32. Wireless hub 32 is configured to determine water stream instructions in response to the user input. Wireless hub 32 transmits the water stream instructions to controller 22, which in turn, controls diverter 20 and/or mixer 24 to deliver a water stream to pipe 46 in relation to (e.g., matches) the user input (e.g., delivers the user a requested level of water hardness). In one or more embodiments, controller 22 may sense and/or determine one or more water properties of the water streams in inlet 12 and/or 26 and use the one or more water properties in controlling diverter 20 and/or mixer 24 to deliver the water stream to pipe 46 in relation to the user input.

The appliance user interface may also be configured to display an alert alerting a user as to how long the water stream is not at the one or more input water properties. Wireless hub 32 may be configured to determine the amount of time for water treatment system 10 to deliver the water stream with the one or more input water properties. During this waiting period, appliance 56 is configured to provide a waste stream to pipe 60 before the one or more desired water properties are met.

In one embodiment, the diverter/mixer/softener subsystem may have a parallel arrangement such that two or more simultaneous water stream outputs may be controlled by controller 22. In such embodiment, two or more appliances and/or outlets may be delivered water streams in response to two or more water user inputs of one or more desired water properties.

Wireless hub 32 is configured for wireless communication with server 62. As shown in FIG. 1, server 62 is remote and exists in a cloud computing architecture. In other configurations, server 62 may exist in a hosted environment where server 62 is local to users, e.g., without the use of an external network, and may be referred to as a hosted solution. Server 62 may host a website or webpages configured to receive user inputs and/or to display current operating conditions of components of water treatment system 10. Server 62 and mobile device 54 may be wirelessly connected. Mobile device 54 may be configured to receive user inputs and/or to display current operating conditions of components of water treatment system 10.

Figure 2:
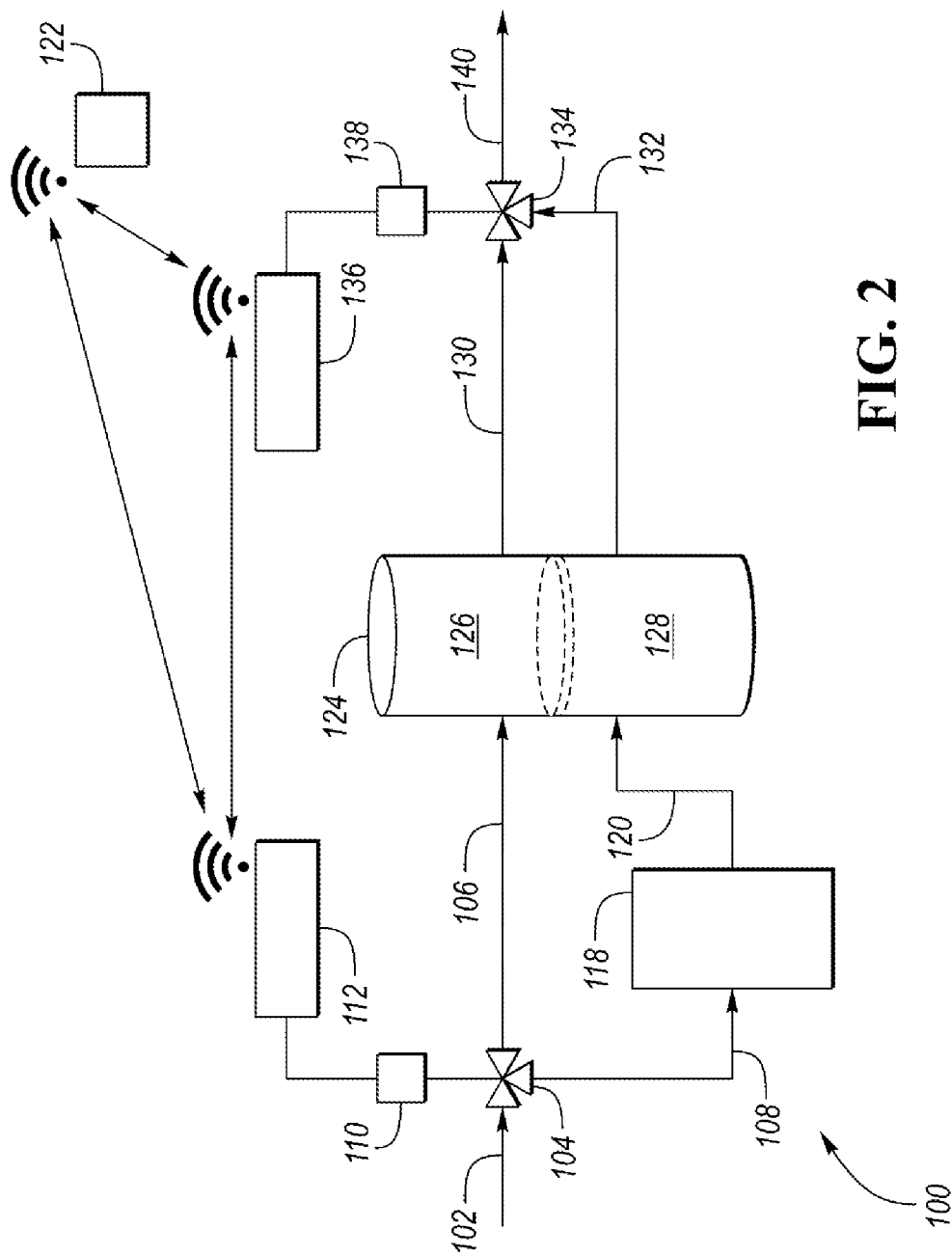
FIG. 2 depicts a schematic diagram of a water treatment system according to a second embodiment.

FIG. 2 depicts a schematic diagram of water treatment system 100 according to a second embodiment. Water treatment system 100 includes inlet 102 configured to admit a water stream (e.g., a stream of water from a municipal water source). Inlet 102 is configured to direct the water stream into valve 104. As shown in FIG. 2, valve 104 is a three-way valve configured to direct at least a portion of the water stream into pipes 106 and/or 108. Diverter 110 is electrically connected to valve 104 and first controller 112. Diverter 110 is configured to change the flow of the water stream between pipes 106 and/or 108. First controller 112 is configured to control diverter 110 to change the flow of the water stream between pipes 16 and/or 18. First controller 112 may be configured to sense and/or determine a water property of the water stream received from inlet 102. First controller 112 is configured to wirelessly communicate with wireless hub 122. The communication between first controller 112 and wireless hub 122 is bidirectional.

Water softener 118 admits a water stream from pipe 108. Water softener 118 treats the water stream to reduce the number of hard cations in the water stream from pipe 108. Water softener 118 provides a purified water stream to pipe 120 and a wastewater stream. The concentration of hard cations in the purified water stream is less than the concentration of hard cations in the wastewater stream.

Water heater 124 includes first compartment 126 and second compartment 128. First compartment 126 of water heater 124 admits inlet the water stream from pipe 106 and second compartment 128 of water heater 124 admits the purified water stream from pipe 120. Water heater 124 is configured to heat the water in the inlet water stream and the water in the purified water stream. Water heater 124 provides the heated water from first compartment 126 to pipe 130. Water heater 124 provides the heated water from second compartment 128 to pipe 132.

Valve 134 is configured to receive the heated water stream from pipe 130 and the heated water stream from pipe 132. Controller 136 is configured to control mixer 138 to mix the heated water stream from pipe 130 and the heated water stream from pipe 132. The mixed water stream exits valve 134 into pipe 140.

Wireless hub 122 may be configured to determine water stream instructions in response to user input to change one or more water properties of the water streaming flowing through pipe 140. Wireless hub 122 transmits the water stream instructions to first and/or second controllers 112 and/or 136, which in turn, control diverter 110 and/or mixer 138 to deliver a water stream to pipe 140 in relation to (e.g., matches) the user input (e.g., delivers the user a requested level of water hardness). In one or more embodiments, controller 136 may sense and/or determine one or more water properties of the water streams in pipes 130 and 132 and the one or more water properties in controlling valve 134 to deliver the water stream to pipe 140 in relation to the user input. Wireless hub 32 may be configured to determine the amount of time for water treatment system 10 to deliver the water stream with the one or more desired water properties.

In one embodiment, water treatment system 100 may be replicated such that two or more simultaneous water stream outputs may be controlled such that two or more appliance and/or outlets may be delivered water streams in response to two or more water operating user inputs of one or more operating properties.

In another embodiment, the sequence of the water treatment device and the water heater (e.g., tankless heater and/or hot water tank) can be interchanged. Water purification may be more efficient when the water is already at elevated temperature (e.g., due to higher salt conductivity at elevated temperature).

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A water treatment system for treating water in a building, the water treatment system comprising:
   an input pipe;
   a first pipe;
   a second pipe;
   a third pipe;
   a water softener device configured to admit an input water stream from the input pipe and to provide first and second outlet streams to the first and second pipes, respectively, the first outlet stream having a first water hardness value of water hardness, and the second outlet stream having a second water hardness value of water hardness;
   a regulating device configured to receive the first and second outlet streams from the first and second pipes, respectively, and to provide a third outlet stream through the third pipe; and
   a water treatment computer including non-transitory computer-readable medium comprising instructions for treating water that, when executed by a processor, cause the processor to perform the following operations:
      receiving an input of a water hardness value of water hardness from a user interface of an appliance or outlet; and
      transmitting first control instructions to the regulating device to adjust a ratio of a first flow rate of the first outlet stream relative to a second flow rate of the second outlet stream to provide the water hardness value in the third outlet stream to the appliance or outlet through the third pipe,
   the regulating device configured to adjust the ratio of the first flow rate of the first outlet stream relative to the second flow rate of the second outlet stream to provide the water hardness value in the third outlet stream to the appliance or outlet through the third pipe.

2. The water treatment system of claim 1, wherein the water treatment computer includes a wireless hub.

3. The water treatment system of claim 1, wherein the receiving and transmitting operations of the water treatment computer are performed wirelessly.

4. The water treatment system of claim 1, wherein the regulating device includes one or more valves and one or more pumps.

5. The water treatment system of claim 1, further comprising a sensor configured to sense a sensed hardness value in the third outlet stream, and the processor configured to perform the following further operation: transmitting second control instructions to the regulating device to stop adjusting the ratio in response to the sensed water hardness value.

6. The water treatment system of claim 1, wherein the appliance or outlet is the appliance, and the appliance is selected from the group consisting of: dishwasher, clothes washer, refrigerator, and steam oven.

7. The water treatment system of claim 1, wherein the processor is configured to perform the following operations: receiving the input of the water hardness value from the user interface of the appliance or the outlet, transmitting first control instructions to the regulating device to adjust the ratio of the first flow rate of the first outlet stream relative to the second flow rate of the second outlet stream to provide the water hardness value in the third outlet stream to the appliance or the outlet, and the regulating device is configured to adjust the ratio of the first flow rate of the first outlet stream relative to the second flow rate of the second outlet stream to provide the water hardness value in the third outlet stream to the appliance or the outlet through the third pipe.

8. The water treatment system of claim 1, wherein the first or second outlet streams of the water softener device is a waste water stream.

9. A water treatment system for treating water in a building, the water treatment system comprising:
   a water softener device;
   a pipe; and
   a central water treatment computer including non-transitory computer-readable medium comprising instructions for treating water that, when executed by a processor, cause the processor to perform the following operations:
      receiving a user input from an interface associated with an appliance or outlet and indicative of a water hardness value of a water hardness for the appliance or outlet;
      transmitting first instructions to the water softener device in response to the water hardness value of the water hardness, the first instructions configured to direct the water hardness device to deliver water with the water hardness value of the water hardness to the appliance or outlet through the pipe;
      determining a delivery time to deliver the water with the water hardness value of the water hardness to the appliance or outlet through the pipe; and
      transmitting an alert when the delivery time has elapsed; and
   the water softener device is configured to treat water according to the water hardness value of the water hardness to obtain first treated water for delivery to the appliance or outlet through the pipe in response to receiving the instructions from the central water treatment computer.

10. The water treatment system of claim 9, further comprising a sensor operable to receive sensed water hardness data values of the water hardness of water flowing through the pipe.

11. The water treatment system of claim 9, wherein the central water treatment computer includes a wireless hub.

12. The water treatment system of claim 9, wherein the receiving and transmitting operations of the central water treatment computer are performed wirelessly.

* * * * *